(12) United States Patent
Kim

(10) Patent No.: US 8,358,513 B2
(45) Date of Patent: Jan. 22, 2013

(54) EXPANSION MODULE FOR MOBILE DEVICE AND MOBILE DEVICE HAVING THE SAME

(75) Inventor: Phil-Sang Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 260 days.

(21) Appl. No.: 12/723,587

(22) Filed: Mar. 12, 2010

(65) Prior Publication Data

US 2011/0096513 A1 Apr. 28, 2011

(30) Foreign Application Priority Data

Oct. 23, 2009 (KR) ........................ 10-2009-0101392

(51) Int. Cl.
*H05K 7/02* (2006.01)
*H05K 7/04* (2006.01)
(52) U.S. Cl. ................... 361/807; 361/809; 361/810
(58) Field of Classification Search ................... 361/800, 361/807, 809, 810
See application file for complete search history.

(56) References Cited

U.S. PATENT DOCUMENTS

| | | | | |
|---|---|---|---|---|
| 4,730,160 A * | 3/1988 | Cusack et al. | ........... | 324/750.07 |
| 5,295,089 A * | 3/1994 | Ambasz | ................... | 361/679.09 |
| 5,859,762 A * | 1/1999 | Clark et al. | .............. | 361/679.41 |
| 6,778,196 B2 * | 8/2004 | Nakamura | ............... | 361/679.27 |
| 6,922,333 B2 * | 7/2005 | Weng et al. | ................ | 361/679.2 |
| 7,280,348 B2 * | 10/2007 | Ghosh | ....................... | 361/679.27 |
| 7,586,743 B2 * | 9/2009 | Lin | .......................... | 361/679.55 |

* cited by examiner

*Primary Examiner* — Hung S Bui
(74) *Attorney, Agent, or Firm* — Birch, Stewart, Kolasch & Birch

(57) ABSTRACT

Disclosed is an expansion module for a mobile device including, a first section at which the mobile device is mounted, the first section obscured by one surface of the mobile device, a second section having a function unit configured to provide functions relating to the mobile device, the second section rotatably connected to the first section, a magnet mounted at the first section and configured to apply a magnetic force to a magnetic member coupled to the mobile device, and an alignment mechanism configured to align the first section, having the mobile device mounted thereat, in a direction intersecting with the second section in a first state.

17 Claims, 10 Drawing Sheets

EXPANSION MODULE FOR MOBILE DEVICE AND MOBILE DEVICE HAVING THE SAME

CROSS-REFERENCE TO RELATED APPLICATION

Pursuant to 35 U.S.C. §119(a), this application claims the benefit of earlier filing date and right of priority to Korean Application No. 10-2009-0101392, filed on Oct. 23, 2009, the contents of which is incorporated by reference herein in its entirety.

BACKGROUND OF THE INVENTION

1. Field of the Invention

The present invention relates to a module for expanding a function of an electronic device and a mobile device having the same.

2. Background of the Invention

Electronic devices can be easily carried and have one or more of functions such as supporting voice and video telephony calls, inputting and/or outputting information, storing data and the like.

As it becomes multifunctional, the portable terminal can be allowed to capture still images or moving images, play music or video files, play games, receive broadcast and the like, so as to be implemented as an integrated multimedia player.

Various attempts have been done for the multimedia device by hardware or software in order to implement such complicated functions. For example, a user interface environment is provided in order for users to easily and conveniently retrieve or select functions.

However, the consideration of the portability of the mobile devices causes difficulty in installing components for input and output and the like, such as various user interfaces, in the mobile devices, thereby restricting users' various requirements for use of the terminals. Therefore, a function expanding device, by which the input/output functions and the like can be expanded and users can be provided with more appropriate usage environments, may be considered.

SUMMARY OF THE INVENTION

Therefore, an object of the present invention is to provide an expansion module coupled with a mobile device so as to be capable of implementing a new form factor of the mobile device, and a mobile device having the same.

Another object of the present invention is to provide an expansion module appropriately aligned with a mobile device to thusly improve user's convenience in use.

To achieve these and other advantages and in accordance with the purpose of the present invention, as embodied and broadly described herein, there is provided a expansion module for a mobile device including, a first section at which the mobile device is mounted, the first section obscured by one surface of the mobile device, a second section having a function unit configured to provide functions relating to the mobile device, the second section rotatably connected to the first section, a magnet mounted at the first section and configured to apply a magnetic force to a magnetic member coupled to the mobile device, and an alignment mechanism configured to align the first section, having the mobile device mounted thereat, in a direction intersecting with the second section in a first state.

In accordance with one embodiment of the present invention, the alignment mechanism may include a third section and a lock portion, wherein the third section may have one end rotatably connected to the first section and another end connected to the second section such that the third section becomes foldable between both the ends. The lock portion may protrude from one end of the first section so as to be locked at least part of the second section in the first state. The second section may be disposed to obscure another surface opposite to the one surface of the mobile device in a second state, and the first section may be rotatable based upon one end of the first section between the first and second states.

In accordance with another embodiment of the present invention, a is connection path for allowing data and/or power exchange between the mobile device and the function unit may be disposed at the third section. The lock portion may include first and second lock members. The first lock member may be formed at the first section so as to be locked at least part of the second section in the second state and overlaid on the third section in the second state, and the second lock member may protrude from the second section so as to support the first lock member.

In accordance with another embodiment of the present invention, the alignment mechanism may include a third section and a support section. The third section may extend from one end of the first section toward the second section, so as to be foldable, and the support section may be rotatably connected to another end of the first section and configured to support a bottom surface by a rotation, the second section laid on the bottom surface.

In accordance with another embodiment of the present invention, the expansion module may include a contact expansion unit. The contact expansion unit may be formed to expand a contact area between the second section and a bottom surface in the first state. The contact expansion unit may be formed in parallel to one surface of the second section, and mounted at the second section to be movable in parallel to the one surface of the second section.

In accordance with another embodiment of the present invention, the function unit may provide at least one of a function of inputting information in the mobile device, a function of outputting information transferred from the mobile device, and a function of controlling the input and/or output functions. A battery may be mounted at the second section to thusly supply power to the function unit.

In accordance with another embodiment of the present invention, the expansion module may include an auxiliary securing portion. The auxiliary securing portion may be formed at the first section and configured to detachably secure the mobile device at the first section.

In accordance with another embodiment of the present invention, a mobile device may include a main body having a display unit, the main body having a magnetic member coupled thereto to be attracted by a magnetic force, and an expansion module detachably coupled to the main body and configured to expand functions of the mobile device.

In accordance with one embodiment of the present invention, the main body may include a front case having the display unit, and a rear case configured to obscure the first section. The magnetic member may be made of a plate and mounted at the rear case.

In accordance with another embodiment of the present invention, the function unit may include at least one of a keypad in a QWERTY configuration and a switch configured to switch on or off the main body.

In accordance with another embodiment of the present invention, the display unit may be formed to have a touch input function, and when the main body is coupled to the expansion module, the touch input function of the display unit is deactivated. When the main body is coupled to the expansion module, an output direction of the display unit may be switched from a portrait direction to a landscape direction.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Figure 1:
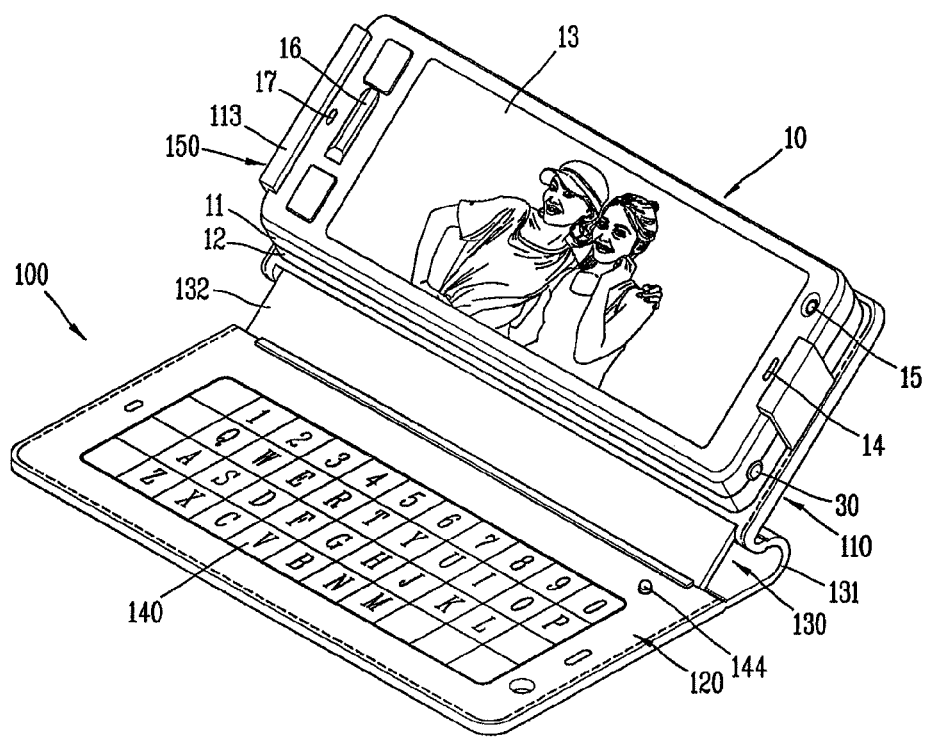
FIG. 1 is a front perspective view of a mobile terminal having an expansion module in accordance with one embodiment of the present invention.

Description will now be given in detail of an expansion module and a mobile electronic device having the same according to the present invention, with reference to the accompanying drawings. This specification employs like/similar reference numerals for like/similar components irrespective of different embodiments, so they all will be understood by the first description. The expression in the singular form in this specification will cover the expression in the plural form unless otherwise indicated obviously from the context.

The mobile electronic device may include a mobile terminal operative in wireless communications. Hereinafter, description will be given in this specification of the mobile terminal as the mobile electronic device; however, the present invention may not be limited to the mobile terminal. For example, the mobile electronic device may include laptop computers, MP3 players, nintendo DS, personal digital assistants (PDAs), portable multimedia players (PMPs), digital cameras, electronic dictionaries, players for playing games, navigators, electronic schedulers and the like, each of which may belong to an individual user for use.

FIG. 1 is a front perspective view of a mobile terminal 10 having an expansion module 100 in accordance with one embodiment of the present invention.

The components illustrated in FIG. 1 are not requirements, so the expansion module 100 and the mobile terminal 10 may be implemented with greater or fewer components. The mobile terminal 10 may not be limited to a bar type, as will be explained herein, but applicable to various types, such as slide type, folder type, swing type and the like.

A case (casing, housing, cover, etc.) forming an outer appearance of a main body of the terminal 10 may be defined by a front case 11 and a rear case 12. Various electronic components may be disposed in a space formed by the front case 11 and the rear case 12. At least one intermediate case may additionally be disposed between the front case 11 and the rear case 12. Further, the cases can be formed of resin in a manner of injection molding, or formed using metallic materials such as stainless steel (STS) and titanium (Ti).

A display unit 13, an audio output module 14, a first video input unit 15, a first manipulation unit 16, an audio input module 17 and the like may be disposed on the front case 11.

The display unit 13 may include a liquid crystal display (LCD) module, an organic light emitting diode (OLED) module and the like for representing visual information. The display unit 13 may further include a touch screen so as to allow a user to perform a touch input.

The audio output module 14 may be configured as a receiver or a speaker. The first video input unit 15 may be a camera module for allowing a user to capture images or video.

The first manipulation unit 16 may receive a command input to control the operation of the mobile terminal 10 according to the one embodiment of the present invention.

The audio input module 17 may be implemented as a type of microphone for allowing inputs of users' voice, other sounds and the like, for example.

The rear case 12 mounted at a rear surface of the mobile terminal 10 is shown having a second manipulation unit 22, an interface 23 (see FIG. 2B), a broadcast signal receiving antenna 30 and the like.

The second manipulation unit 22 may alternatively be installed at a side surface of the rear case 12. From the perspective of convenience in manipulation, the second manipulation unit 22 may preferably be disposed at a side surface unwrapped by the expansion module 100 (see FIG. 2B). The second manipulation unit 22 in addition to the first manipulation unit 16 can be referred to as a manipulation portion, which can be manipulated in any tactile manner that user can make a touch input. For instance, the manipulation portion can be implemented as a dome switch or touchpad which can receive information or commands input by a user in a pushing or touching manner, or implemented in a manner of using a wheel, a jog or a joystick to rotate keys.

Regarding each function, the first manipulation unit 16 can be used as a menu key for inputting commands such as START, END, SCROLL or the like, and the second manipulation unit 12 can function as a hot key for performing a scrolling function and other specific function, such as activation of the first video input unit 15.

The interface unit 23 may interface the mobile terminal 10 and external to devices so as to allow data exchange therebetween or the like. For example, the interface 23 may be at least one of a wired/wireless access terminal for earphones, a short-range communication port (e.g., IrDA port, BLUETOOTH port, wireless Lan port, and the like), and power supply terminals for supplying power to the portable terminal. For example, the interface 23 may be a card socket for accommodating an external card such as Subscriber Identification Module (SIM), User Identity Module (UIM), memory card for storing information, or the like.

The broadcast signal receiving antenna 30 in addition to an antenna for communications may be disposed at one side of the rear case 12. The antenna 30 may be retractable into the rear case 12.

Referring to FIG. 1, the mobile terminal 10 may be coupled with the expansion module 100 which provides an additional or expanded function associated with the mobile terminal 10. In order for a user to select, from the perspective of portability or function expansion, a case of using the mobile terminal 10 as it is or a case of coupling the expansion module to the main body of the mobile terminal 10 for use, the expansion module 100 may preferably be detachably coupled to the mobile terminal 10.

The expansion module 100 may include first and second sections 110 and 120, and an alignment mechanism 130.

The first section 110 is shown having the mobile terminal 10, and configured to be obscured by one surface of the mobile terminal 10. In detail, the first section 110 may obscure a surface formed by the rear case 12. Unlike the drawing, the first section 110 may be configured to cover only a part of the rear case 12.

The second section 120 is shown having a function unit 140 for providing functions associated with the mobile terminal 10, and rotatably coupled to the first section 110.

The second section 120 may be conformable to the first section 110 in size. The function unit 140 may provide a function of inputting information (signals, commands, etc.) to the mobile terminal 10 and a function of outputting information transferred from the mobile terminal 10. The function unit 140 may also provide a function of controlling at least one of the information input and output functions. For the control function, an additional operation unit, a microprocessor or the like may be employed as the function unit 140 so as to assist a controller 40 (see FIG. 8) installed in the mobile terminal 10.

This embodiment employs, as the function unit 140, a keypad 141 having a QWERTY configuration, whereby a user can input information (e.g., characters or numbers) more conveniently and fast upon writing e-mails or preparing documents.

Referring to FIG. 1, the function unit 140 may include a switch 144 for turning on or off the mobile terminal 10. Accordingly, the power-on or power-off state of the mobile terminal 10 may be controlled in a state of the mobile terminal 10 being mounted at the expansion module 100, in detail, in a first state. This configuration may be more useful for electronic schedulers, PMPs and the like, power of which is turned on only upon the use of such mobile electronic devices.

In order for the mobile terminal 10 to be detachably coupled to the first section 110, a magnetic member 31 (see FIG. 3) attracted by a magnetic force may be coupled to the mobile terminal 10, and a magnet M for applying the attractive force to the magnetic member 31 may be disposed at the first section 110 of the expansion module 100.

The expansion module 100 may include an auxiliary securing portion 150 formed at the first section 110 for detachably securing the mobile terminal 10 to the first section 110.

This embodiment discloses fixing hooks 113 as one example of the supplementary fixing portion 150. The fixing hooks 113 may be located at sides of the first section 110 and the sides of the mobile terminal 10 are secured by the fixing hooks 113. Here, the present invention may not be limited to the structure; however, the auxiliary securing portion 150 may be configured as a fixing band and the like for locking sides of the mobile terminal 10.

The alignment mechanism 130 may be configured in the first state to align the first section 110 having the mobile terminal 10 in a direction of intersecting with respect to the second section 120. If the function unit 140 is a keypad and most of the front surface of the mobile terminal 10 is occupied by the display unit 13, the first state may be similar or equal to the arrangement between a keypad and a display unit upon using a laptop computer. Consequently, a user can be convenient in use of the mobile terminal 10 and the mobile terminal 10 can have a selectively changed form factor.

The alignment mechanism 130 may include a third section 131 and a stopped portion 132.

The third section 131 may have one end rotatably connected to the first section 110 and another end connected to the second section 120, and configured to be foldable between the two ends.

The third section 131 may be integrally formed with the first and second sections 110 and 120, and located between the first and second sections 110 and 120. In the first state, the three sections may be configured in a sequentially curved form or in a zigzag form, due to the third section 131, in the order of the first section 110—the third section 131—the second section 120.

If at least parts of the first to third sections 110, 120 and 131 are made of a different material from that of the mobile terminal 10, for example, made of leather or the like, a new impression can be made in view of coupling the mobile terminal 10 to the expansion module 100, as compared to using only the mobile terminal 10.

The stopped portion 132 may protrude from one end of the first section 110 to be locked at least part of the second section 120 in the first state. The stopped portion 132 may maintain the first state, and render the mobile terminal 10, in detail, the display unit 131 mounted at the first section 110 form an angle appropriate for a user's manipulation (e.g., information input) with the function unit 140 (which is disposed substantially in parallel to the second section 120). Even when watching a broadcast or video through the display unit 13, if the second section 120 is laid on a table or desk, the user can view the display unit 13 at a more comfortable or appropriate angle.

Figure 2A:
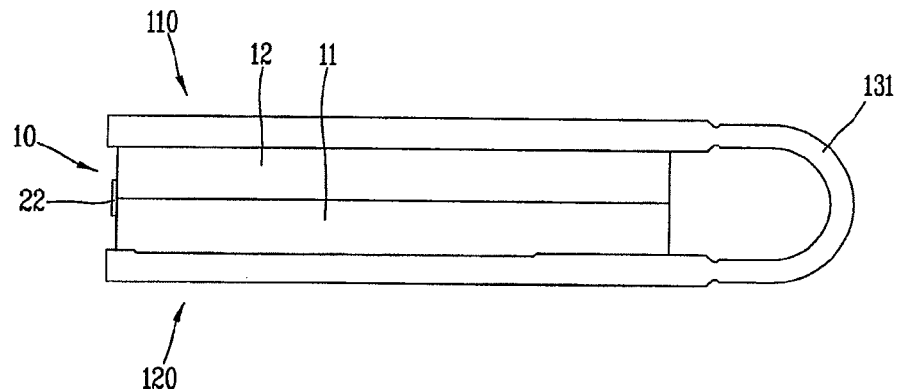
FIG. 2A is a side view illustrating a second state in which the expansion module of FIG. 1 wraps up the mobile terminal.
Figure 2B:
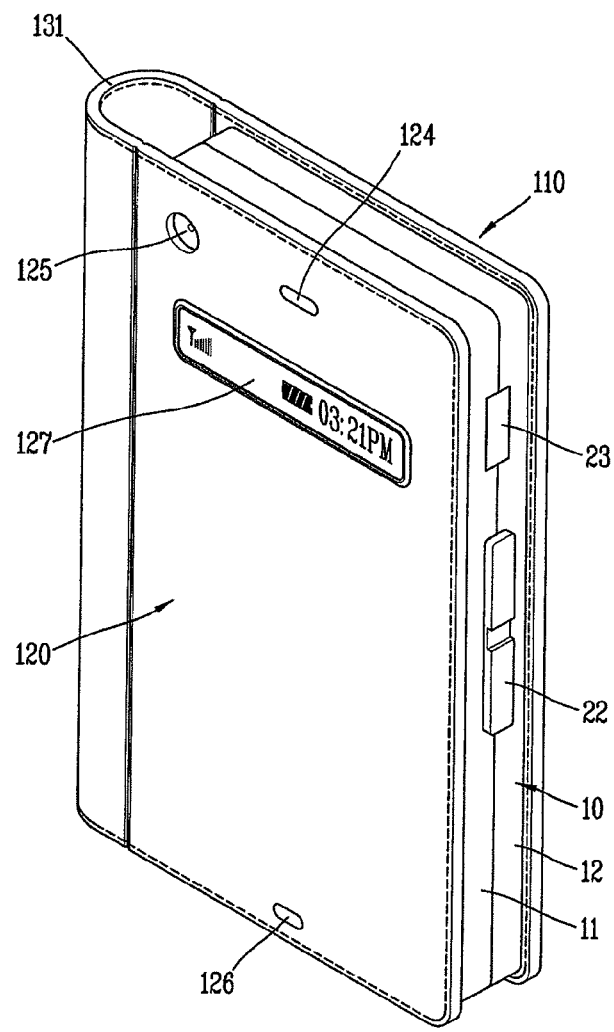
FIG. 2B is a front view of the mobile terminal illustrated in FIG. 2A.

FIG. 2A is a side view showing a second state where the expansion module 100 of FIG. 1 covers the mobile terminal 10, and FIG. 2B is a front view of the mobile terminal of FIG. 2A.

As shown in FIGS. 2A and 2B, the alignment mechanism 130 allows the second section 120 can obscure at least part of another surface (i.e., an opposite surface to a surface being obscured by the first section 110) of the mobile terminal 10 in the first state. To this end, the first section 110 may be formed to be rotatable based on one end of the first section 110 between the first and second states.

Under the second state, the mobile terminal 10 and the expansion module 100 look like a diary, thereby improving the user's portability. Also, the expansion module 100 serves as a protection cover for wrapping up the mobile terminal 10, such that the mobile terminal 10 can be more safely protected from external impact or stimulus.

The second section 120 is shown having openings 124 to 126 corresponding to the first audio output module 14, the first video input unit 14 and the audio input unit 17. So, the user can use the mobile terminal 10 through the openings 124 to 126 even in the second state.

Referring to FIG. 2B, an auxiliary display unit 127 may be disposed on an outer surface of the second section 120, and the auxiliary display unit 127 may be employed to provide brief information from the mobile terminal 10, such as a current time, a battery residual capacity and the like.

Figure 3:
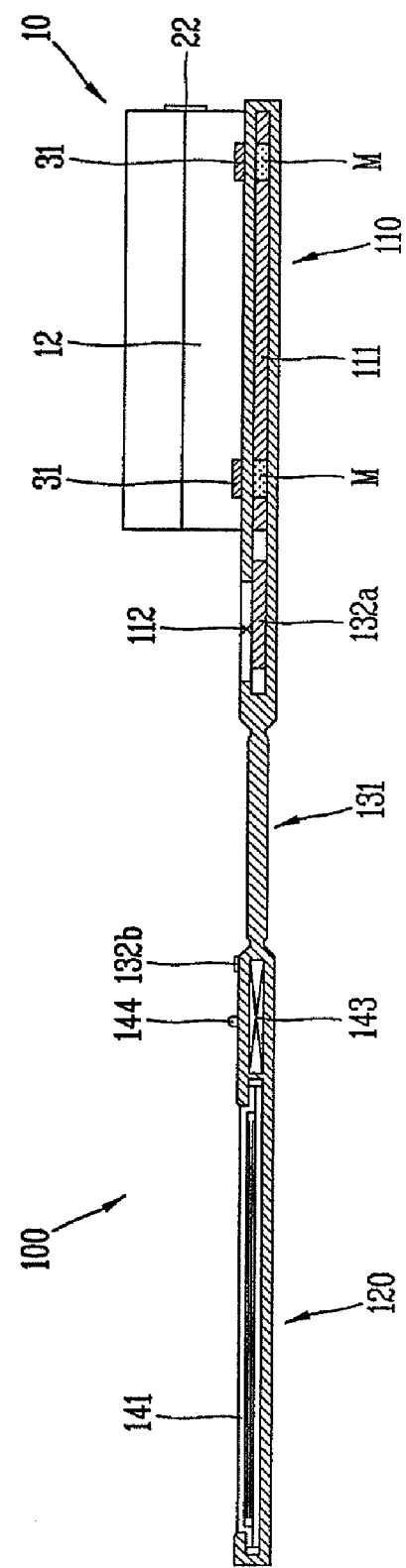
FIG. 3 is a sectional view illustrating an unfolded state of the expansion module illustrated in FIG. 1.
Figure 4:
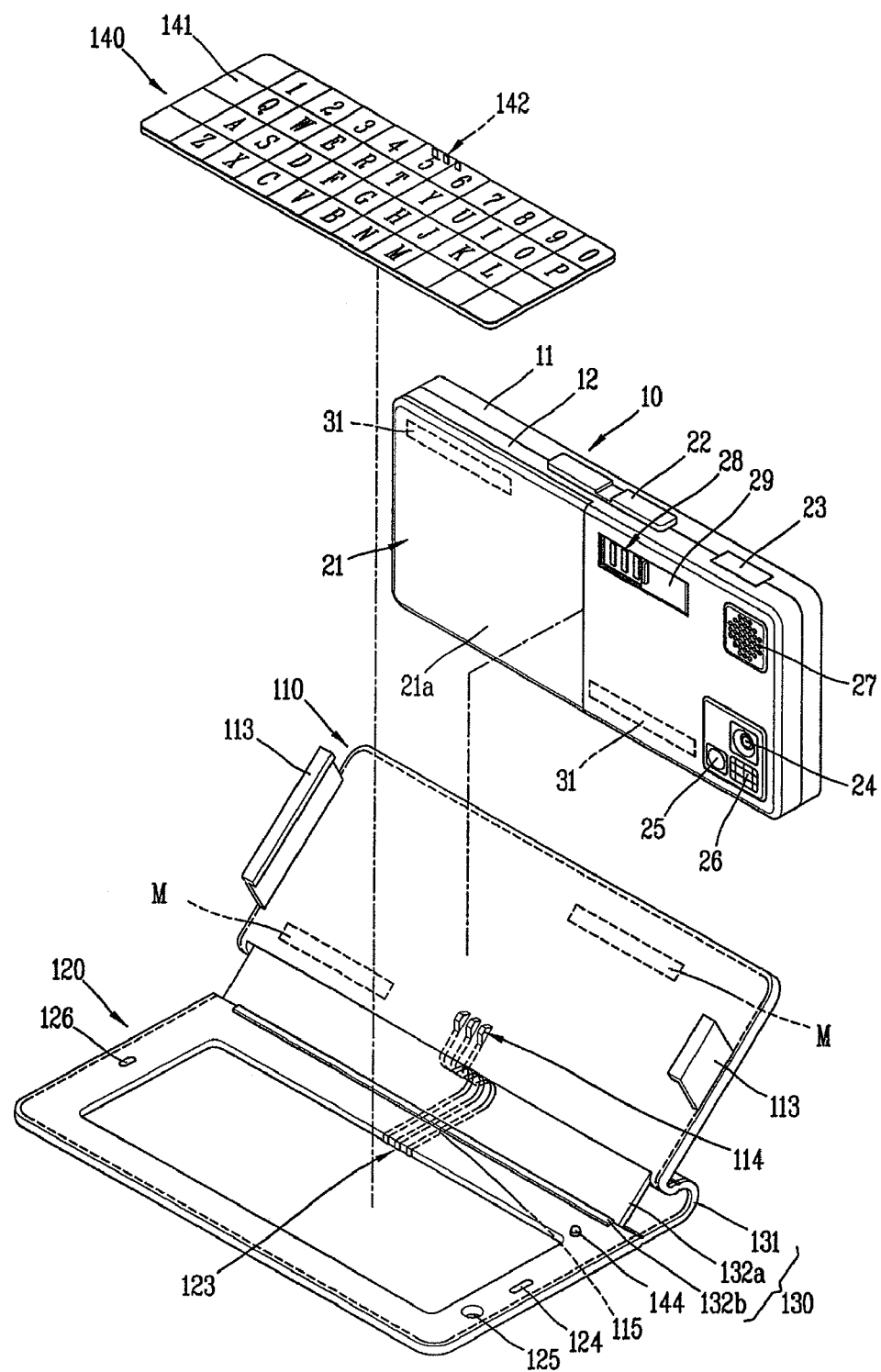
FIG. 4 is a disassembled perspective view illustrating a detailed configuration of FIG. 1.

FIG. 3 is a sectional view illustrating an unfolded state of the expansion module 100 of FIG. 1, and FIG. 4 is a disassembled perspective view illustrating a detailed configuration of FIG. 1.

As shown in FIG. 3, the first to third sections 110, 120 and 131 of the expansion module 100 are unfolded (open) to be all in parallel to the mobile terminal 10.

A plate member 111 is mounted in the first section 110, and a magnet M is located in the plate member 111. Referring to FIG. 3, the magnet M is inserted in the plate member 111; however, the present invention may not be limited to this structure, but the magnet M may be mounted at one surface of the plate member 111.

A first lock member 132a may be formed at a position spaced apart from the plate member 111 of the first section 110. The first lock member 132a is locked at least part of the second section 120 in the first state (see FIG. 1), and laid on the third section 131 in the second state (see FIG. 2A). The first lock member 132a may be located in a twofold cover of the first section 110. A through hole 112 may be formed through an inner cover of the twofold cover of the first section 110 so that the first lock member 132a is inserted therethrough to be stopped at the is second section 120 in the first state.

The third section 131 may be thinner than the first and second sections 110 and 120. Notches may be formed between the third section 131 and the first and second sections 110 and 120, respectively. The notches may help the first and second sections 110 and 120 to be rotated with respect to the third section 131.

Referring to FIGS. 3 and 4, the second section 120 is shown having a second lock member 132b for supporting the first lock member 132a. The first and second lock members 132a and 132b may implement a lock portion 132, and be configured to maintain the first state. Referring to FIG. 4, an end of the first lock member 132a supports an end of the second section 120, and the second lock member 132b supports a rear surface of the first lock member 132a.

The second section 120 is shown having a keypad 141 as an example of the function unit 140 (see FIG. 1), and a battery 143 for supplying power to the keypad 141.

Referring to FIG. 4, a power supply unit 21, a second video input unit 24 and the like may further be provided at the rear case 12 of the mobile terminal 10.

The power supply unit 21 may be located at the rear case 12 for supplying power to the mobile terminal 10. The power supply unit 21 may be, for example, a rechargeable battery so as to be detachably coupled to the rear case 12 for charging.

The power supply unit 21 may be charged by the battery 143 (see FIG. 3) located at the second section 120 of the expansion module 100.

The second video input unit 24 faces a direction which is substantially opposite to a direction faced by the first video input unit 15 (see FIG. 1). Also, the second video input unit 24 may be a camera having different pixels from those of the first video input unit 15. For instance, the first video input unit 15 may operate with relatively lower pixels (lower resolution). Thus, the first video input unit 15 may be useful when a user can capture his face and send it to another party during a video call or the like. On the other hand, the second video input unit 24 may operate with relatively higher pixels (higher resolution) such that it can be useful for a user to obtain higher quality pictures for later use.

A flash 25 and a mirror 26 may be disposed adjacent to the second video input unit 24. The flash 25 operates in conjunction with the second video input unit 24 when taking a picture using the second video input unit 24. The mirror 26 can cooperate with the second video input unit 24 to allow a user to photograph himself in a self-portrait mode. The second audio output module 17 may output sound in conjunction with the first audio output module 14 or independent of the first audio output module 14.

The rear case 12 may further be provided with a terminal portion 28 adjacent to the power supply unit 21. The terminal portion 28 may be provided to exchange power or power and data with the expansion module 100. The terminal portion 28 may selectively be open or closed by a door 29 because it is preferable for the terminal portion 28 to be veiled when the mobile terminal 10 is independently used. The door 29 may be slidably or orbitingly mounted at the rear case 12 to open or close the terminal portion 28.

Terminal portions 114 and 123, as interfaces of the expansion module 100 corresponding to the terminal portions 28 of the mobile terminal 10, may be located at the first or second section 110 or 120.

In detail, the terminal portion 114 of the first section 110 is electrically connected to the terminal portion 123 of the second section 120, the terminal portion 114 of the first section 110 is connected to the mobile terminal 10, and the terminal portion 123 of the second section 120 is connected to a terminal portion 142 of the keypad. A connection path 115 for allowing data and/or power exchange between the mobile terminal 10 and the function unit 140 may be located at the third section, and electrically connect the terminal portions 114 and 123.

A magnetic member 31 may be disposed at a position of the mobile terminal 10 corresponding to the magnet M of the expansion module 100. As shown, the magnetic member 31 may be made of a metallic plate, and mounted to an inner surface of the rear case 12. However, the present invention may be not limited to that. For example, a battery cover 21a may be formed of a metallic material with magnetism.

Figure 5:
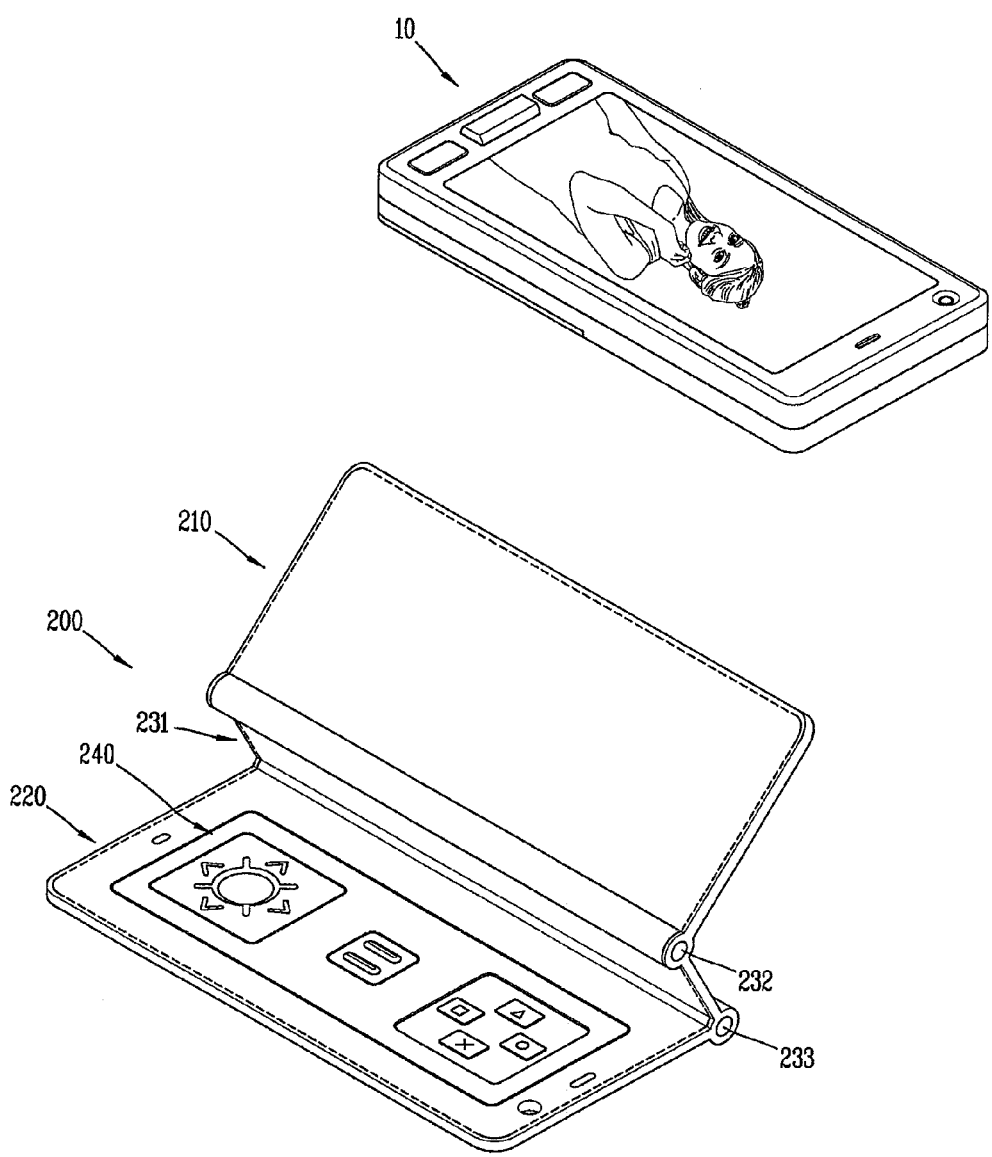
FIG. 5 is a perspective view illustrating a separated state between an expansion module and a mobile terminal in accordance with another embodiment of the present invention.

FIG. 5 is a perspective view showing a separated state between the mobile terminal 10 and the expansion module 100 in accordance with another embodiment of the present invention.

As shown in FIG. 5, the alignment mechanism 130 may include a third section 231 and a pair of hinge modules 232 and 233. The third section 231 may integrally extend from first and second sections 210 and 220. The hinge modules 232 and 233 may be located at a portion where the first section 210 is connected to the third section 231 and at a portion where the second section 220 is connected to the third section 231, respectively. In the first state (see FIG. 1), the to three sections may be configured in a sequentially curved form or in a zigzag form, due to the third section 231, in the order of the first section 210—the third section 231—the second section 220.

Unlike the previous embodiment, this embodiment may employ a game keypad 240 as a function unit.

Figure 6A:
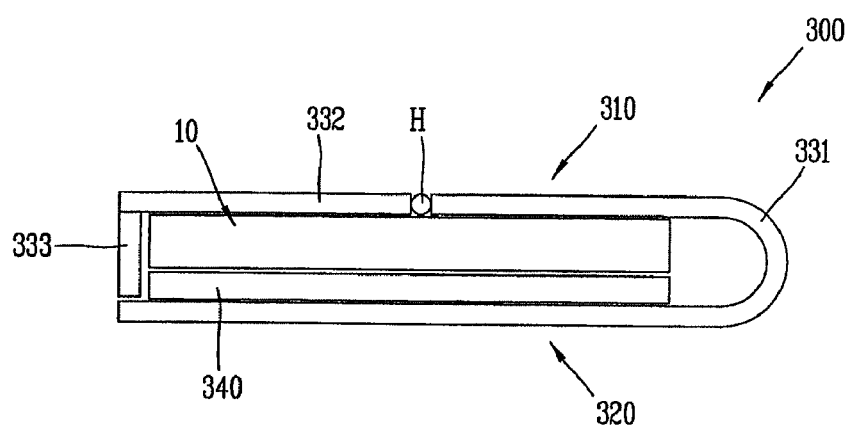
FIGS. 6A and 6B are overviews illustrating a mobile terminal and an expansion module in accordance with another embodiment of the present invention.
Figure 6B:
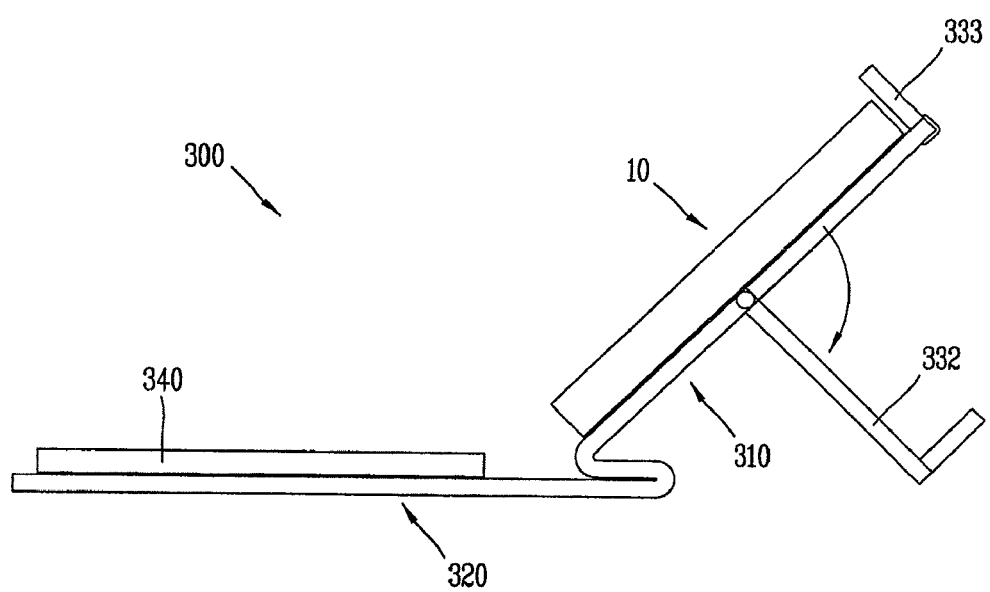

FIGS. 6A and 6B are overviews of a mobile terminal and an expansion module in accordance with another embodiment of the present invention.

As shown in FIGS. 6A and 6B, an alignment mechanism 330 may include a third section 331 and a support section 332.

The third section 331 may extend from one end of a first section 310 toward a second section 320 to be foldable. The support section 332 may rotatably be connected to another end of the first section 310, and configured to support a bottom surface on which the second section 320 is laid.

In detail, the first section 310 is connected to the support section 332 by a hinge H. The support section 332 is rotated farther away from the rear surface of the mobile terminal 10, and an end portion of the support section 332 located at the farther side from the rotating center thereof is then supported at the bottom surface. Accordingly, the first state (see FIG. 1) may be maintained more stably.

Referring to FIGS. 6A and 6B, a cover 333 bent with respect to the principal surface of the support section 332 may be formed at an end of the support section 332. The cover 333 may be configured to obscure one side surface of the mobile terminal 10 in the second state (see FIG. 2A), thereby protecting the mobile terminal 10 from external impacts.

Figure 7A:
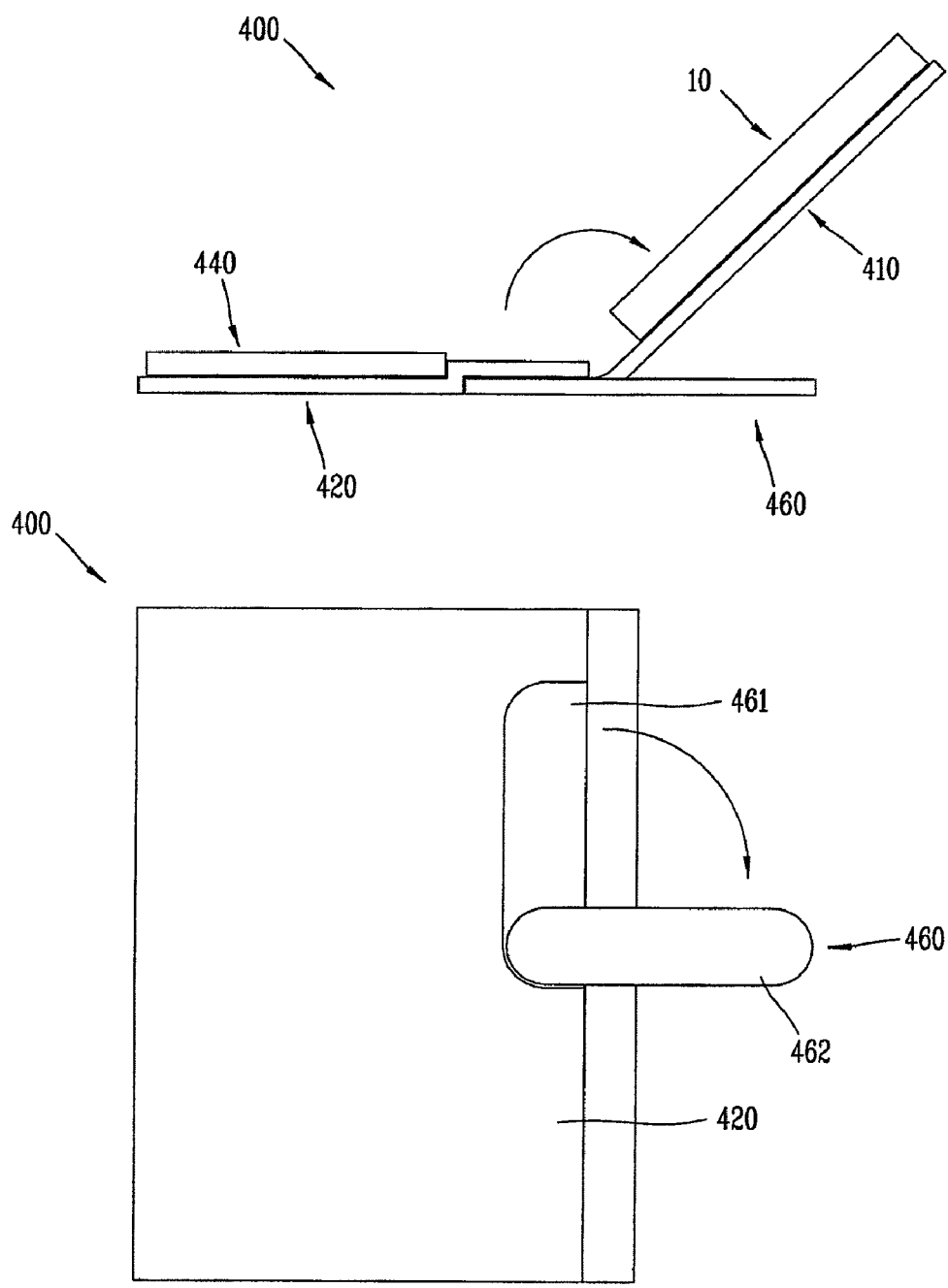
FIGS. 7A to 7C are overviews illustrating a mounted state of the mobile terminal to each expansion module in accordance with another embodiment of the present invention.
Figure 7B:
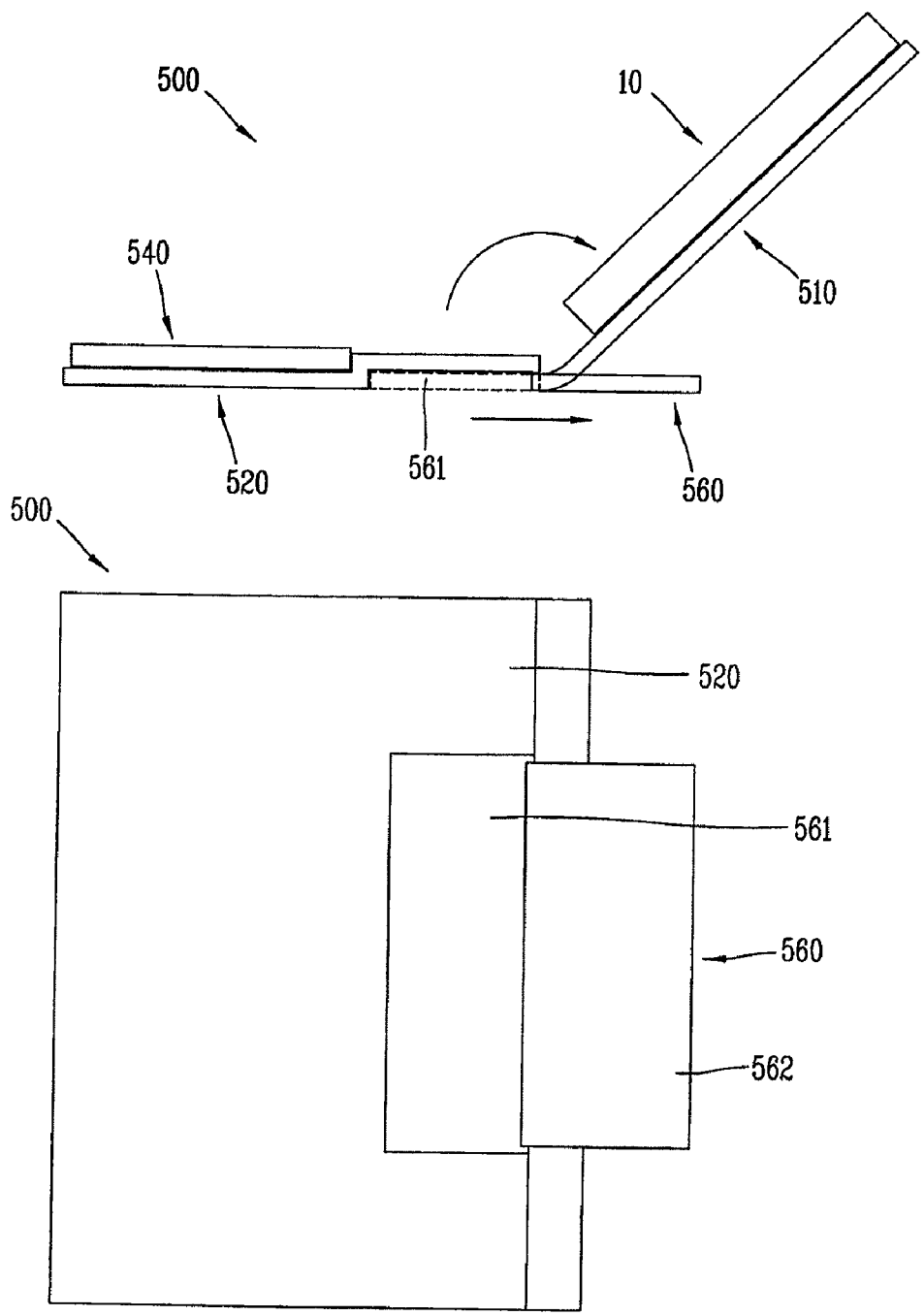
Figure 7C:
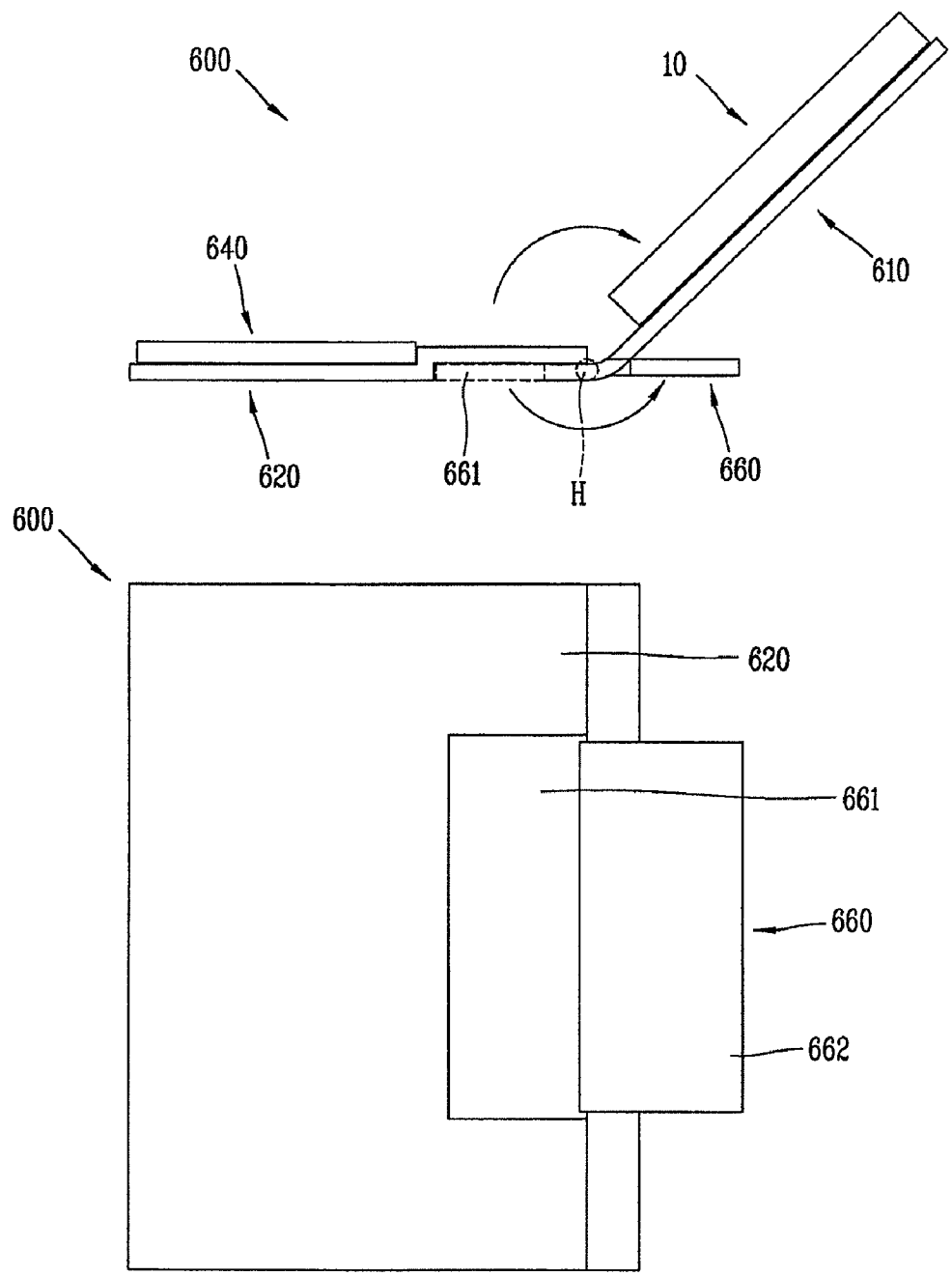

FIGS. 7A to 7C are overviews showing a coupled state of the mobile terminal 10 to each of expansion modules 400, 500 and 600 in accordance with another embodiments of the present invention.

As shown in FIGS. 7A to 7C, each of the expansion modules 400, 500 and 600 may be provided with a contact expansion unit 460, 560, 660 for expanding a contact area between a second section 420, 520, 620 and the bottom surface in the first state.

Each of the contact expansion units 460, 560 and 660 may be formed in parallel to one surface of the second section 420, 520, 620, and mounted to the second section 420, 520, 620 so as to be in parallel to the one surface of the second section 420, 520, 620.

Referring to FIG. 7A, the contact expansion unit 460 may include a recess portion 461 recessed into one surface of the second section 420, and an expansion member 462 inserted into the recess portion 461 and rotated on the one surface of the second section 420 based upon one end thereof. The expansion member 462 may be configured such that an opposite surface to a surface facing the bottom of the recess portion 461 is flush with one surface of the second section 420.

Referring to FIG. 7B, an expansion member 562 may be slidable along a side surface of a recess portion 561. Referring to FIG. 7C, an expansion member 662 may be rotated based upon a hinge H so as to expand a contact area between a second section 620 and the bottom surface.

Figure 8:
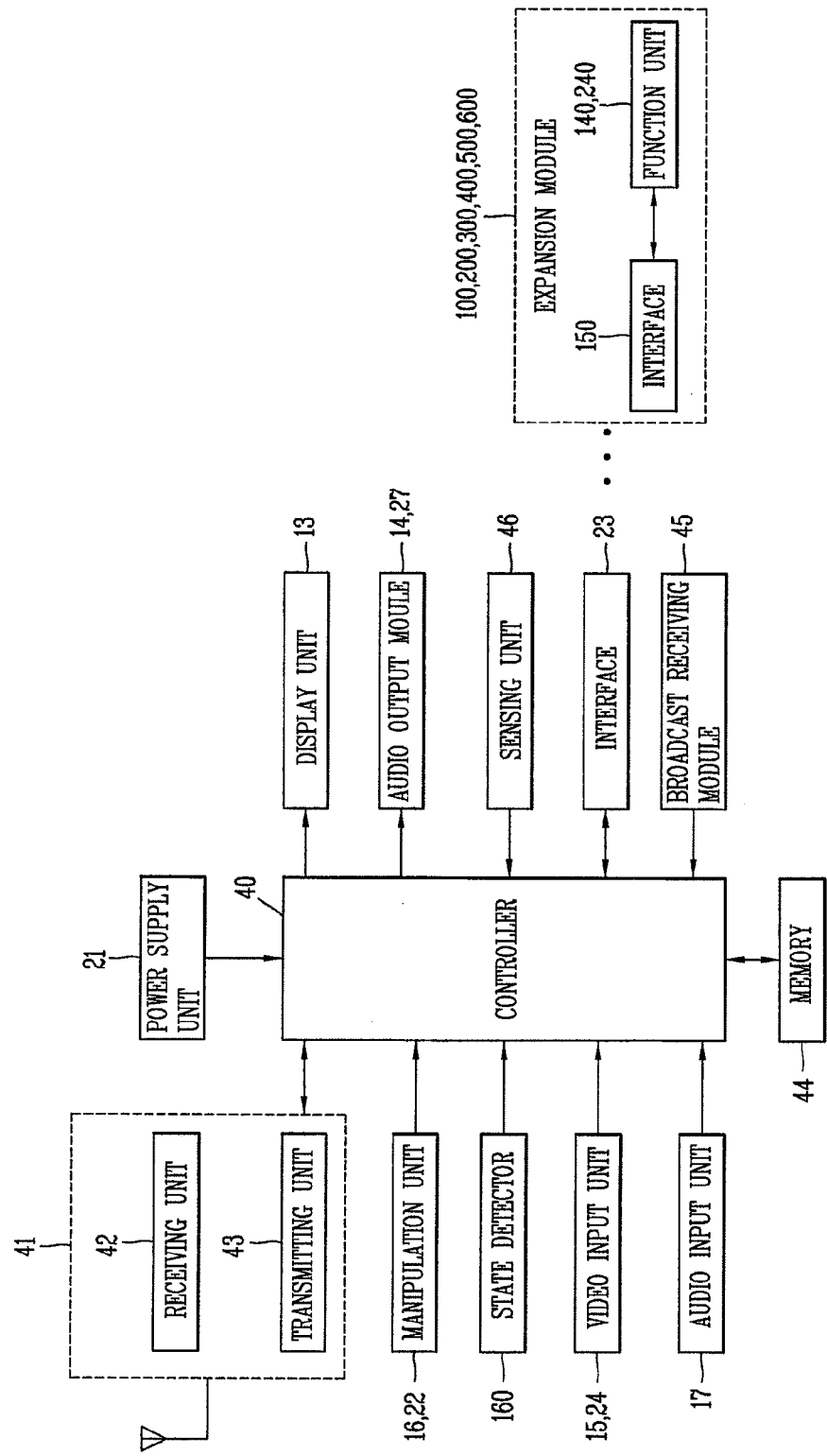
FIG. 8 is a block diagram of a mobile terminal in accordance with the present invention.

FIG. 8 is a block diagram of a mobile terminal in accordance with the present invention.

Referring to FIG. 8, the mobile terminal in accordance with one embodiment of the present invention may include a wireless communication module 41, manipulation units 16 and 22, video input units 15 and 24, an audio input unit 17, a display unit 13, audio output modules 14 and 27, a sensing unit 46, an interface 23, a broadcast receiving module 45, a memory 44, a power supply unit 21, an auxiliary securing portion 150, a state detector 160, a function unit 140, 240, and a controller 40.

The controller 40 typically controls an overall operation of the mobile terminal. For example, the controller 40 may perform related control and processing for a voice call communication, data communication, telephony communication and the like.

Also, the controller 40 may control operations of the mobile terminal according to the present invention in addition to the typical control function.

The wireless communication module 41 may transmit and receive radio signals with a mobile communication base station via an antenna. For example, the wireless communication module 41 manages transmission and reception of audio data, text data, video data and control data under the control of the controller 40. To this end, the wireless communication module 41 may include a transmitting unit 42 for modulating and transmitting a signal to be sent, and a receiving unit 43 for demodulating a signal received.

The manipulation units 16 and 22 may be configured, as shown in FIG. 1, thus to provide the controller 40 with key input data input by a user to control the operations of the mobile terminal. The manipulation units 16 and 22 may include a dome switch, a touchpad (e.g., static pressure/capacitance), a jog wheel, a jog switch and the like.

The video input units 15 and 24 process image frames of still images or video obtained by an image sensor in a video call mode or a capturing mode. Such processed image frames are converted into image data displayable on the display unit 13 to be then output on the display unit 13.

The image frames processed by the video input units 15 and 24 may be stored in the memory 44 under the control of the controller 180 or be sent to the exterior via the wireless communication module 41.

The audio input unit 17 receives an external audio signal via a microphone while the mobile terminal is in a particular mode, such as phone call mode, recording mode and voice recognition. This audio signal is processed and converted into digital data. Such processed digital data is converted into a data format transmittable to a mobile communication base station via the wireless communication module 41 when the mobile terminal is in the phone call mode, and then outputted to the wireless communication module 41. The processed digital data may be stored in the memory 44 in a recording mode. The audio input unit 17 may include assorted noise removing algorithms to remove noise generated in the course of receiving the external audio signal.

The display unit 13 displays information processed in the portable terminal. For example, when the portable terminal is in a phone call mode, the display unit 13 displays User Interface (UI) or (Graphic User Interface (GUI) related to the call under the control of the controller 40. If the display unit 13 includes a touch screen, it may be used as an input device as well as an output device.

The audio output module 14 and 27 may convert audio data received from the wireless communication module 41 or audio data stored in the memory 44 under the control of the controller 40 when the portable terminal is in the call-receiving mode, a phone call mode, a recording mode, a voice recognition mode, or a broadcast receiving mode. Such converted audio data is then outputted to the exterior.

The audio output modules 14 and 27 also output an audio signal associated with a function (e.g., outputting a call receiving sound, a message receiving sound, or the like) performed in the mobile terminal. Such audio output units 114 and 131 may include a speaker, a receiver, a buzzer and the like.

The sensing unit 46 provides status measurements of various aspects of is the portable terminal. For instance, the sensing unit 46 may detect an open/close status of the portable terminal, a change of position of the portable terminal or a component of the portable terminal, a presence or absence of user contact with the portable terminal and the like, thereby generating a sensing signal for controlling the operation of the portable terminal. For example, the sensing unit 186 senses the open or closed state of a slide type portable terminal, and outputs the sensed result to the controller 40, such that the operation of the portable terminal can be controlled. Other examples include the sensing unit 46 sensing the presence or absence of power provided by the power supply unit 21, the presence or absence of a coupling or other connection between the interface 23 and an external device.

The interface 23 is often implemented to couple the mobile terminal with external devices. Typical external devices include wired/wireless headphones, external chargers, wired/wireless data ports, card sockets (e.g., memory card, SIM/UIM card or the like) and the like. The interface 23 may allow the portable terminal to receive data or power from external devices and transfer such data or power to each component inside the mobile terminal, or transmit internal data of the mobile terminal to external devices.

If a short-range communication module, such as a Bluetooth module, is employed as the interface 23, data exchange between the mobile terminal 10 and the expansion module 100 to 600 may be implemented wirelessly, not via the terminal portions 28 and 112.

Corresponding to the interface 23, the auxiliary securing portion 150 may be provided at the expansion module 100 to 600. The auxiliary securing portion 150 may also be the short-range communication module. Unlike to this, If terminal portions 28, 112, 123 and 142 are merely used, the auxiliary securing portion 150 may be the terminal portions 112 and 123 or the terminal portions 112, 123 and 142.

The memory 44 may store a program for the control and processing of the controller 40, or temporarily store input/output data (e.g., phone book data, messages, still images, video or the like). Also, the memory 44 may store a program for controlling the operation of the mobile terminal according to the present invention. The memory 44 may include typically known hard disk, a card-type memory (e.g., SD or XD memory), a flash memory, RAM, ROM and the like.

The broadcast receiving module 45 may receive a broadcast signal transmitted via satellites or terrestrial waves and convert such broadcast signal into a broadcast data format capable of being output to the audio output modules 14 and 17 and the display unit 13 so as to output the converted signal to the controller 40. The broadcast receiving module 45 may also receive additional data associated with broadcasting (e.g., Electric Program Guide (EPG), channel list, or the like). The broadcast data converted in the broadcast receiving module 45 and the additional data may be stored in the memory 44.

The power supply unit 21 (i.e., battery) provides power required by the various components for the mobile terminal. The provided power may be internal power, external power, or combinations thereof. The power supply unit 21 may exchange power with the function unit 140, 240 via the expansion module interface 150. In some cases, the power supply unit 21 may be charged by the function unit 140, 240. A power supply unit may also be employed in the expansion module 100 to 600.

The function unit 140, 240 may exchange data with the main body via the controller 40. Accordingly, an input/output function or a charging function by the function unit 140, 240 may be controlled by the controller 40.

The state detector 160 may detect state information relating to whether the expansion module 100 to 600 is coupled to the mobile terminal 10 or separated therefrom or whether the expansion module 100 to 600 is in the first state or in the second state, and the like. Such detected state information is then transferred to the controller 40. The controller 40 consequently controls an operation of the mobile terminal 10 according to the state of the expansion module 100 to 600 based upon the received information.

For example, if the state detector 160 detects that the expansion module 100 to 600 is in a coupled state with the mobile terminal 10, the controller 40 then deactivates a touch input function of the display unit 13.

If a power switch provided at the expansion module 100 to 600 is switched on, the mobile terminal 10 is turned on. Accordingly, the state detector 160 detects the coupled state between the expansion module 100 to 600 and the mobile terminal 10. The controller 40 thus controls the mobile terminal based upon the coupled state with the expansion module 100 to 600. For example, the controller 40 activates the display unit 13 of the mobile terminal 10 to display an initial screen.

Also, the controller 40 determines whether the mobile terminal 10 is coupled to the expansion module 100 to 600 based upon the detected result of the state detector 160. If in the coupled state, the controller 40 changes at least one of output forms of the mobile terminal 10. For example, if the mobile terminal 10 is independently used, the output direction of the display unit 13 is equal to a portrait direction (see FIG. 5), and then after the mobile terminal 10 is coupled to the expansion module 100 to 600, the output direction may be changed into a landscape direction (see FIG. 1). Such change may be conformable to a user's purpose to use a QWERTY keypad 140 or a game keypad 240 as a function unit or watch a movie via the display unit 13.

If it is determined by the state detector 160 that the mobile terminal 10 is separated from the expansion module 100 to 600, the controller 40 may render the output direction of the display unit 13, the output level of the audio output module 14, or the like, return to an original state. Hence, a user can remain the independent use environment of the mobile terminal 10 without a specific manipulation from the case of using the mobile terminal 10 in the coupled state with the expansion module 100 to 600.

The expansion module according to the present invention having such configuration is provided with a function unit, thereby expanding functions of the mobile terminal under less limitation. Consequently, a form factor of the mobile terminal can selectively be changed.

Also, the expansion module is surface-contacted between a magnet and a magnetic member, thereby configuring a more stable detachable mechanism with a mobile terminal main body.

Furthermore, an alignment mechanism that a first section and a second section are disposed to intersect with each other in a first state can improve user's convenience in use of the mobile terminal mounted at the first section. Also, an employment of a contact expansion unit allows the mobile terminal to be laid on a bottom more stably.

The mobile terminal according to the present invention may include the expansion module mounted to the main body, such that the main body can be used independently or in a function-expanded state due to the expansion module.

The aforesaid configuration and method for the expansion module and the mobile terminal having the same is not to be construed as limiting the present disclosure. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile device comprising:
a main body having a display unit;
a first magnetic member coupled to the main body; and an expansion module detachably coupled to the main body, the expansion module being configured to expand capabilities of the mobile device, the expansion module including:
- a first section to which the main body is mounted, at least a portion of the first section being covered by at least a portion of the main body;
- a second section pivotally connected to the first section;
- a second magnetic member provided at the first section to face the first magnetic member; and
- a function unit connectable to the main body to expand capabilities of the mobile device, the function unit being provided at the second section.

2. The device of claim 1, further comprising
a support section configured to support the main body in the first state.

3. The device of claim 1, wherein the expansion module further comprises a contact expansion unit configured to expand a contact area of the second section with a surface supporting the second section in the first state, the contact expansion unit being formed substantially parallel to one surface of the second section, and the expansion unit being connected to the second section to be movable to a position substantially parallel to said one surface of the second section.

4. The device of claim 3, wherein the contact expansion unit is either slidably or pivotally connected to the second section.

5. The device of claim 1, wherein the function unit includes at least one of a keypad having a QWERTY configuration, a switch configured to switch on or off the main body, and a game keypad.

6. The device of claim 1, wherein the display unit is configured to provide a touch input function, and
when the main body is coupled to the expansion module, the touch input function of the display unit is deactivated.

7. The device of claim 1, wherein, when the main body is coupled to the expansion module, an output direction of the display unit is switched from a portrait direction to a landscape direction.

8. The device of claim 1, wherein the first magnetic member is a plate provided at the main body.

9. The device of claim 8, wherein the first magnetic member is a battery cover for the main body.

10. The device of claim 1, further comprising an auxiliary securing portion to couple the main body to the first section.

11. The device of claim 1, wherein one of the first and second magnetic members has the properties of a magnet, and the other of the first and second magnetic members is capable of being attracted by a magnet.

12. The device of claim 1, further comprising an alignment mechanism configured to support the main body in a first state such that a plane defined by the main body intersects the second section in the first state.

13. The device of claim 12, wherein the main body has a first surface and a second surface opposite the first surface, and
wherein the first section is pivotable between the first state and a second state where said plane defined by the main body extends substantially parallel to the second section, and the second section is configured to cover the second surface opposite to the first surface of the main body in the second state.

14. The device of claim 13, wherein the alignment mechanism includes:
- a third section having one end pivotally connected to the first section and another end connected to the second section, the third section being foldable between both ends; and
- a stopper portion extending from one end of the first section, the stopper portion being configured to engage at least part of the second section when the first section is in the first state, and wherein the stopper portion includes:
- a first lock member located at the first section; and
- a second lock member at the second section, the second lock member being configured to support the first lock member, wherein the first lock member is locked at least part of the second section in the first state and overlaid on the third section in the second state.

15. The device of claim 12, further comprising a connection path disposed at the alignment mechanism, the connection path being configured to allow at least one of data and power exchange between the main body and the function unit.

16. The device of claim 12, wherein the alignment mechanism includes a third section having one end pivotally connected to the first section and another end pivotally connected to the second section.

17. The device of claim 16, wherein each end of the third section is pivotally connected to the corresponding first and second sections by a hinge module.

* * * * *